US007311222B2

(12) United States Patent
Shigeyama et al.

(10) Patent No.: US 7,311,222 B2
(45) Date of Patent: Dec. 25, 2007

(54) DRUG DISPENSER

(75) Inventors: Yasuhiro Shigeyama, Toyonaka (JP); Hiroyuki Kanda, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 292 days.

(21) Appl. No.: 10/531,450

(22) PCT Filed: Oct. 14, 2003

(86) PCT No.: PCT/JP03/13119

§ 371 (c)(1),
(2), (4) Date: Apr. 14, 2005

(87) PCT Pub. No.: WO2004/035437

PCT Pub. Date: Apr. 29, 2004

(65) Prior Publication Data

US 2006/0060596 A1 Mar. 23, 2006

(30) Foreign Application Priority Data

Oct. 18, 2002 (JP) ............................ 2002-305167

(51) Int. Cl.
*B65G 59/06* (2006.01)

(52) U.S. Cl. ...................... 221/280; 221/175; 221/239; 221/255; 221/268; 221/270

(58) Field of Classification Search ................ 221/239, 221/255, 268, 270, 280, 175; 312/291, 271, 312/295
See application file for complete search history.

(56) References Cited

U.S. PATENT DOCUMENTS 1,424,150 A * 8/1922 Burnham .................... 221/123
3,367,730 A * 2/1968 Andrews et al. ............ 312/204

(Continued)

FOREIGN PATENT DOCUMENTS

DE 28 54 990 11/1979

(Continued)

OTHER PUBLICATIONS

Microfilm of the specification and drawings annexed to the request of Japanese Utility Model Application No. 21101/1983 (Laid-open No. 127298/1984) (Hoya Glass Works, Ltd.), Aug. 27, 1984.

(Continued)

*Primary Examiner*—Gene O. Crawford
*Assistant Examiner*—Timothy Waggoner
(74) *Attorney, Agent, or Firm*—Wenderoth, Lind & Ponack, L.L.P.

(57) ABSTRACT

A drug dispenser which can easily align drugs when filling it with the drugs. In a drug dispenser in which a lowermost drug of a plurality of drugs (100) stacked in a vertical direction and contained in a drug case (1) is pushed out in a horizontal direction to dispense it, a door (7) is provided on the front surface of the drug case (1). A drug aligning device (second door 11) is provided on the inner surface of the door (7), the drug aligning device pushes the front ends of the plurality of drugs (100) contained in the drug case (1) to align the rear ends thereof when the door (7) is closed.

11 Claims, 8 Drawing Sheets

U.S. PATENT DOCUMENTS

| | | | | |
|---|---|---|---|---|
| 3,870,135 | A * | 3/1975 | Allen | 194/205 |
| 4,514,021 | A * | 4/1985 | Sundermeier et al. | 312/291 |
| 5,143,430 | A * | 9/1992 | Craven et al. | 312/291 |
| 6,578,735 | B1 * | 6/2003 | Mothwurf | 221/255 |

FOREIGN PATENT DOCUMENTS

| | | |
|---|---|---|
| GB | 2 019 821 | 11/1979 |
| IT | 1105891 | 11/1985 |
| JP | 54-144676 | 11/1979 |
| JP | 59-127298 | 8/1984 |
| JP | 2-130972 | 10/1990 |
| JP | 3-48143 | 3/1991 |
| JP | 7-244328 | 9/1995 |

OTHER PUBLICATIONS

Microfilm of the specification and drawings annexed to the request of Japanese Utility Model Application No. 41366/1989 (Laid-open No. 130972/1990) (Fujitsu Ltd.), Oct. 30, 1990.

* cited by examiner (a)

(b)

DRUG DISPENSER

BACKGROUND OF THE INVENTION

Conventionally, in a drug dispenser for dispensing packed drugs such as blister packs 100 as shown in FIG. 7, heat tablets 101 as shown in FIG. 8 and special ampoules 102 as shown in FIG. 9 at the request of a pharmacist, a plurality of drug cases are stacked in the drug case in a vertical direction so that the lowermost drug can be pushed out in a horizontal direction by a pushing mechanism to dispense it.

In this kind of drug dispenser, when the shortage of the drug is caused, the drag case is filled with the drugs stacked. If the end surfaces of the drugs do not align in a vertical direction but are dislocated in a horizontal direction, a pushing mechanism for pushing out the lowermost drug in a horizontal direction may fail to operate normally. Therefore, when filling the drug case with the drugs, it has been necessary to line up the drugs so that the rear ends of the drugs are aligned, making the filling work troublesome.

SUMMARY OF THE INVENTION

In view of disadvantages of the prior art dispensers described above, the object of the present invention is to provide a drug dispenser which can easily align the drugs when filling it with the drugs.

As a means for solving the object, the present invention provides a drug dispenser in which a lowermost drug of a plurality of drugs stacked in a vertical direction and contained in a drug case is pushed out in a horizontal direction to dispense it, wherein a door is provided on the front surface of the drug case and wherein a drug aligning means is provided on the inner surface of the door, the drug aligning means pushes the front ends of the plurality of drugs contained in the drug case to align the rear ends thereof when the door is closed.

According to the above means, when opening the door of the drug case, filling the drug case with the drugs and closing the door, the drug aligning means pushes the front ends of the plurality of drugs contained in the drug case to align the rear ends thereof. Therefore, when filling the drug case with the drugs it is not necessary to align the drugs manually, enabling the drug filling work to be easily conducted.

The door may comprise a first door disposed outside and a second door disposed inside, wherein the second door may constitute the drug aligning means. Thus, it is possible to press the front ends of the plurality of drugs using the inner surface of the second door and align the drugs so as to be flush with each other.

The first and second doors may be adapted to open and close by different hinges respectively, wherein the distance between the first and second doors when closing is smaller than that when opening. Thus, the width of the drug case can be made smaller, allowing a plurality of drug cases to be disposed in a high density. On the other hand, the drugs can be aligned as rearward as possible within the drug case, facilitating construction and arrangement of the drug pushing mechanism which is disposed below the stacked drugs.

The first and second doors may have an interlocking mechanism to allow the second door to be opened and closed in conjunction with the first door when the first door is opened and closed. Thus, opening and closing the door can be easily conducted.

The drug dispenser may further comprise a sensor for detecting that the second door is in a closed position, wherein an operation to dispense the drugs is made possible when the sensor detects that the second door is in a closed position. Thus, it is possible to conduct operation a drug dispensing operation in a state where the door is closed and the drugs are aligned completely.

The door may slide in a vertical direction and may be adapted to slide downward to be locked at the predetermined open position and closed position. Thus, it is possible to lock the door within a simple construction. When the door is opened, the door is locked in a predetermined opened position and never moved while filling the case with the drugs, enabling the filling work to be conducted smoothly. When the door is closed, the door is locked in a predetermined closed position. Therefore, there is no possibility that the door will be unexpectedly opened and the drugs dropped, thereby ensuring safety.

BRIEF DESCRIPTION OF THE DRAWINGS

FIG. 6(*c*) is a perspective view of the door in a locked state;

DETAILED DESCRIPTION OF THE PREFERRED EMBODIMENTS

Hereinafter, embodiments of the present invention will be described.

Figure 1:
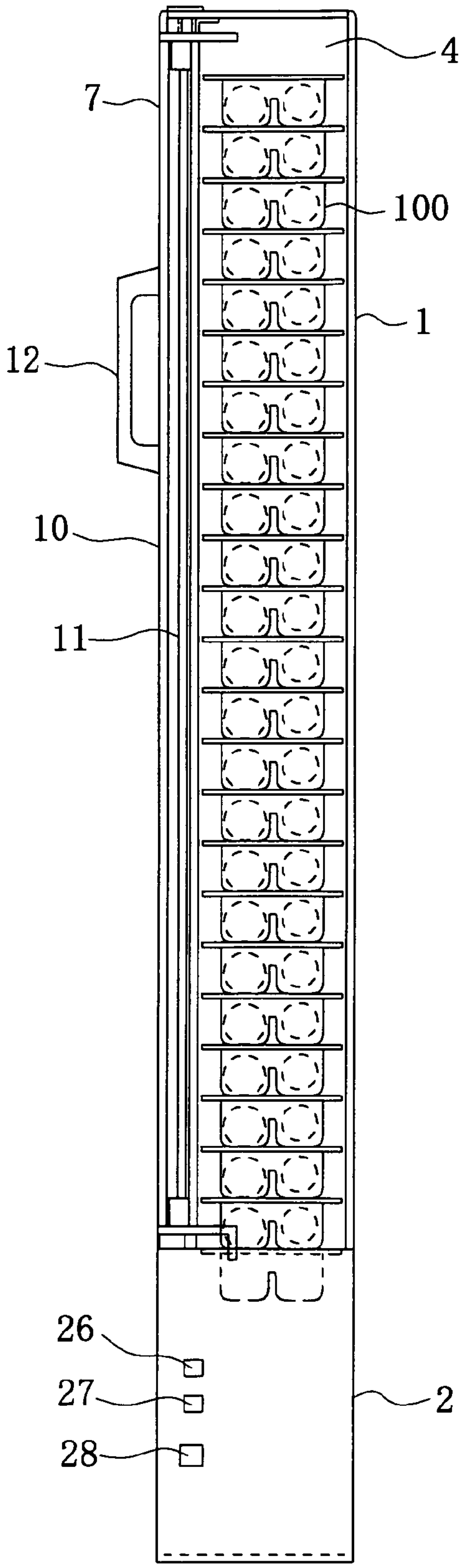
FIG. 1 is a front view of a drug dispenser according to the present invention with a door opened.
Figure 2:
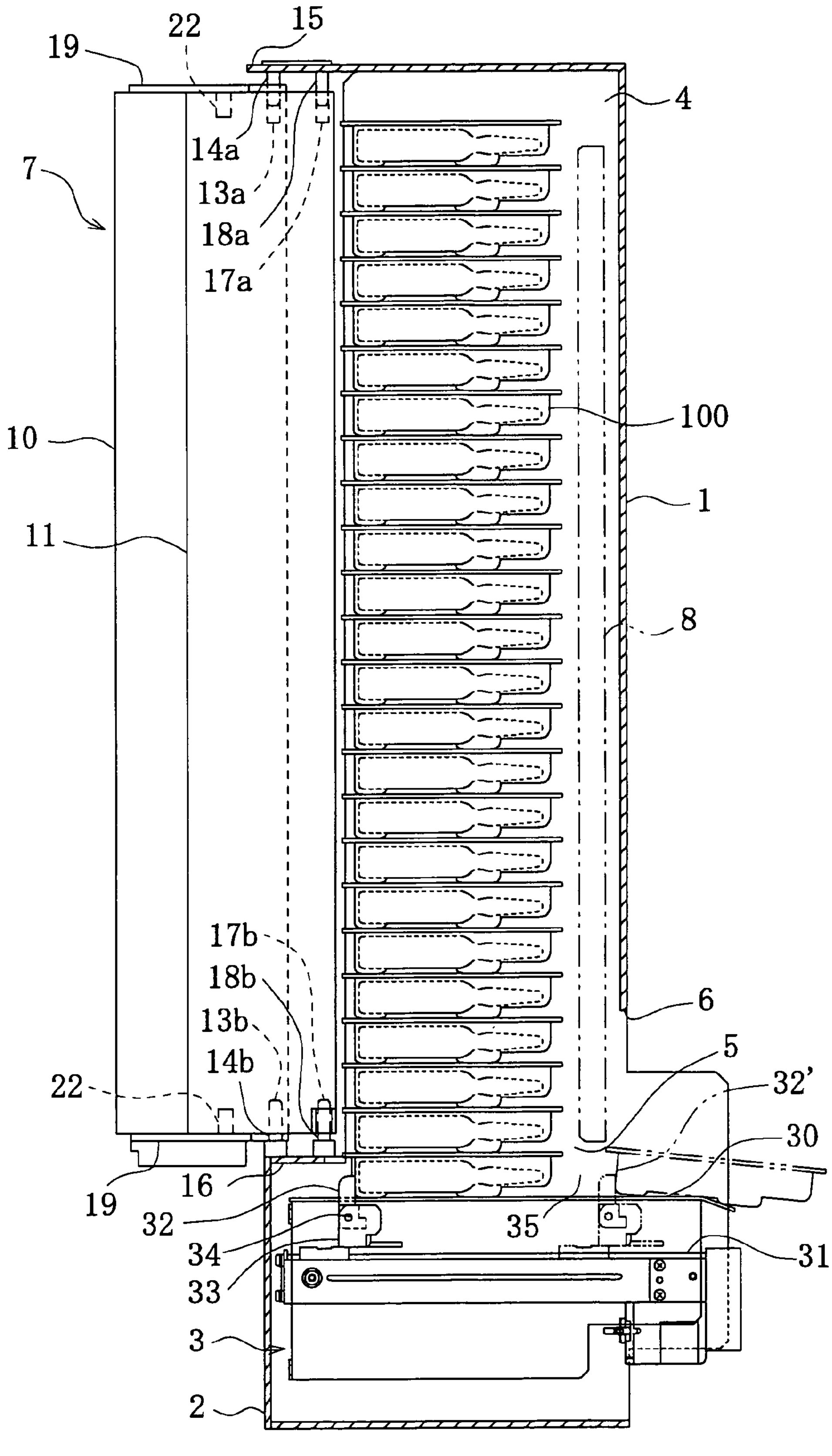
FIG. 2 is a left side view of the drug dispenser of FIG. 1.
Figure 3:
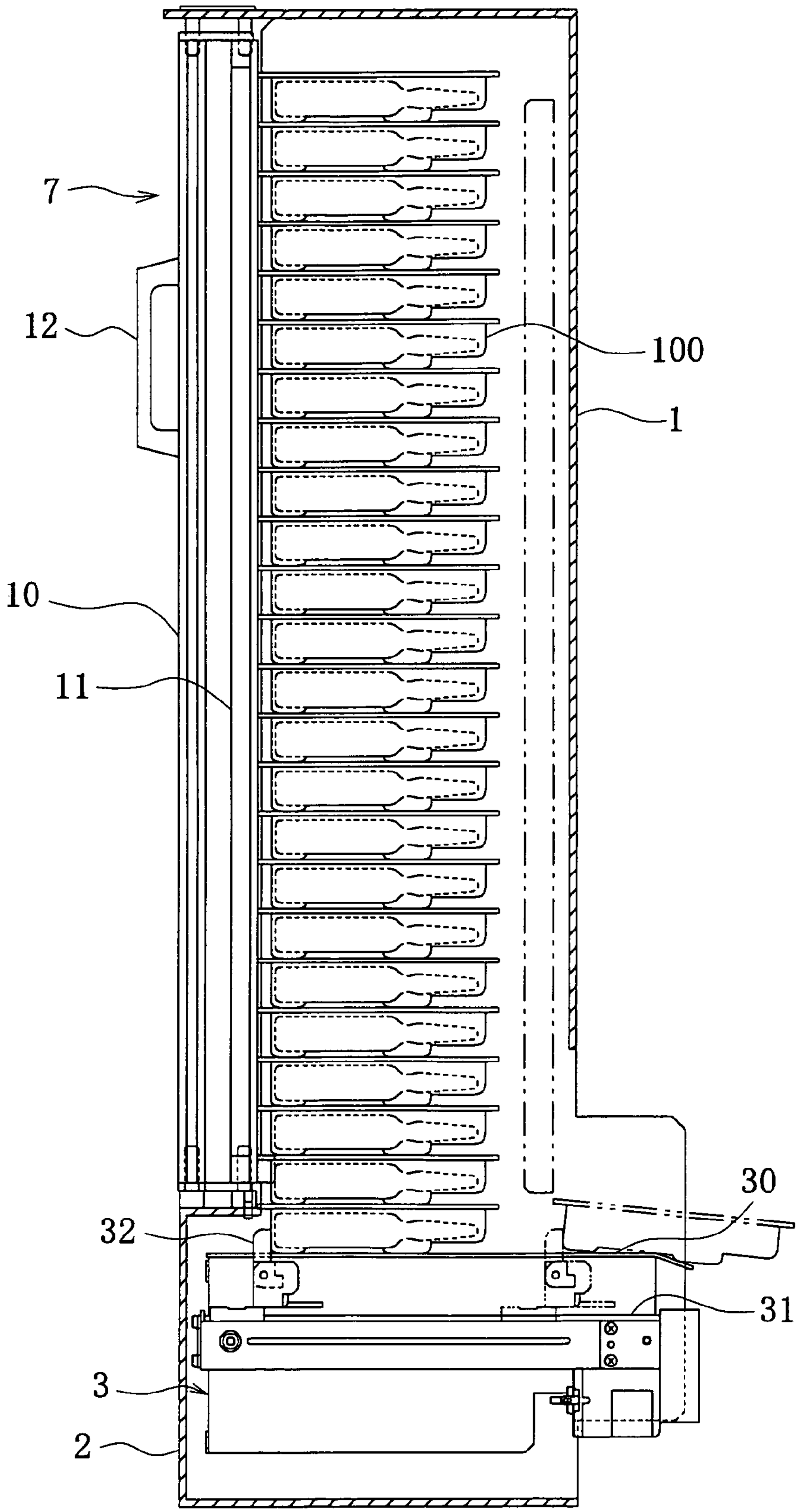
FIG. 3 is a left side view of the drug dispenser of FIG. 1 with the door closed.

FIGS. 1-3 show a drug dispenser according to the present invention. The drug dispenser has a drug case 1 and a lower case 2 integrally formed on the lower end of the drug case 1. In the lower case 2 is contained a drug pushing mechanism 3.

Figure 7:
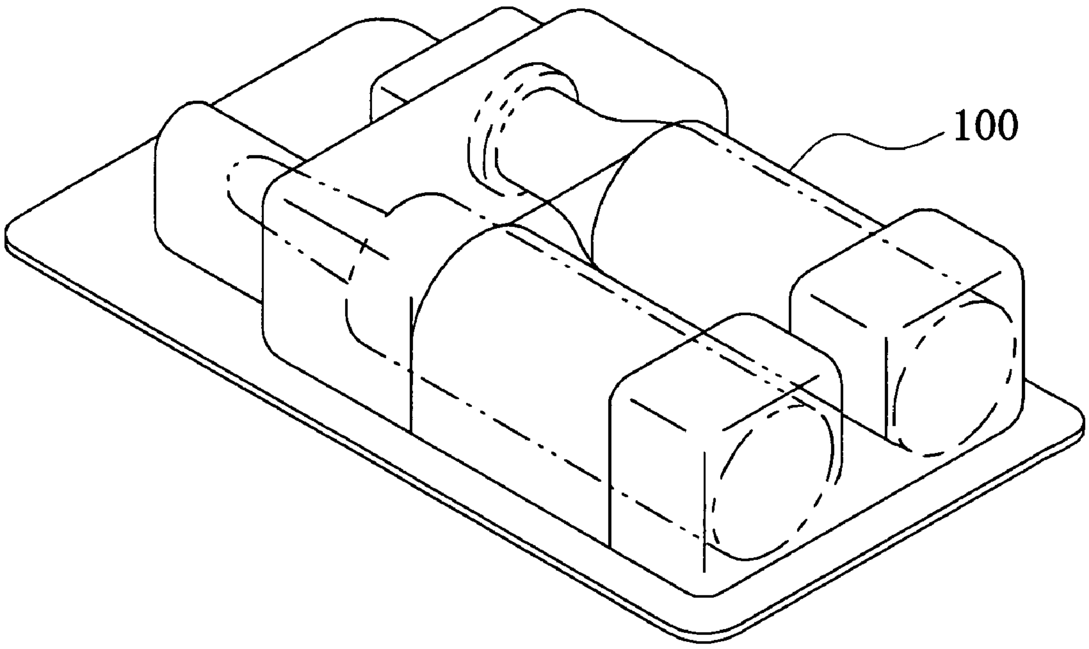
FIG. 7 is a perspective view of an example of a blister pack.

The drug case 1 comprises a rectangular box which is long in a vertical direction. In the front surface, the bottom surface and the lower portion of the rear surface, openings 4, 5, 6 are formed respectively. The opening 4 of the front surface can be opened and closed by means of a door 7. In the drug case 1 of the present embodiment, a plurality of drugs 100 each comprising a blister pack as shown in FIG. 7 are stacked and contained in a vertical direction. On the deep side within the drug case 1 is provided an alignment plate 8, the position of which is adjustable in a back and forth direction in accordance with a size of the drug 100 to be contained. Similarly, on the left side within the drug case 1 is provided an alignment plate 9 (see FIG. 4(*a*)), the position of which is adjustable in a left and right direction.

The door 7, which opens and closes the opening 4 of the drug case 1, comprises a first door 10 disposed outside and a second door 11 disposed inside. On the outer surface of the first door 10 is attached a handle 12. The recessed hinge portions 13*a*, 13*b* formed on the upper and lower ends of the left side of the first door 10 are fitted into a projected hinge portion 14*a* projected downwardly from a protrusion piece 15 which is extended from the upper wall of the drug case 1 and a projected hinge portion 14*b* projected upwardly from a shelf portion 16 formed between the drug case 1 and the lower case 2 respectively so that the opening 4 of the drug case 1 can be opened and closed by substantially 90°. Similarly, the recessed hinge portions 17*a*, 17*b* formed on the upper and lower ends of the left side of the second door 11 are fitted into a projected hinge portion 18*a* projected downwardly from the protrusion piece 15 and a projected hinge portion 18*b* projected upwardly from the shelf portion 16, respectively so that the opening 4 of the drug case 1 can be opened and closed by substantially 90°.

Figure 4:
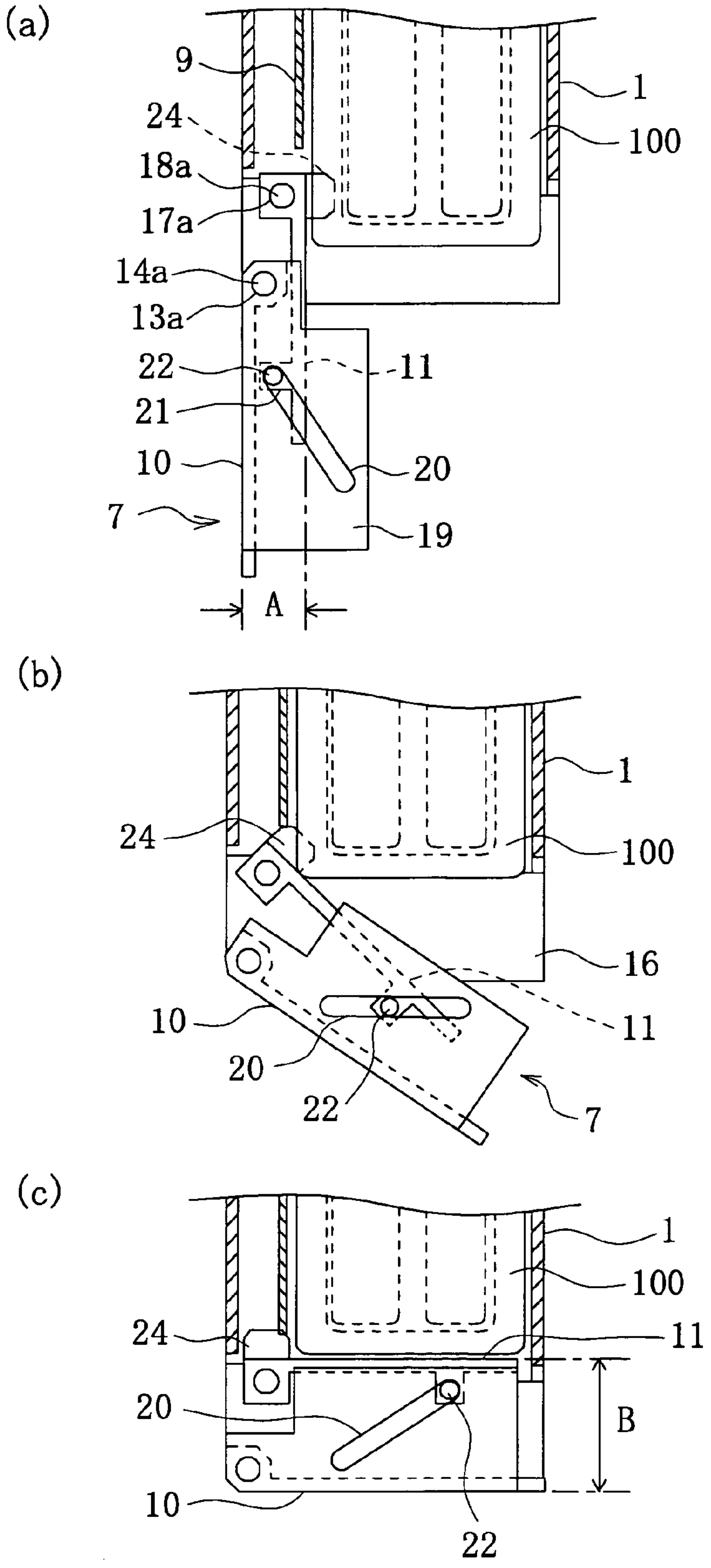
FIGS. 4(*a*), 4(*b*) and 4(*c*) are plan views of the drug dispenser with the door opened, with the door closing, and with the door closed, respectively.

As shown in FIG. 4, the projected hinge portions 18*a*, 18*b* of the second door 11 are disposed obliquely backward on the projected hinge portions 14*a*, 14*b* of the first door 10. Thus, the distance A between the first door 10 and the second door 11 when the door 7 as shown in FIG. 4(*a*) is opened is smaller than the distance B between the first door 10 and the second door 11 when the door 7 is closed as shown in FIG. 4(*c*). As the distance A is narrow, the width of the drug case 1 can be made smaller, allowing a plurality of drug cases 1 to be disposed in the high density. Moreover, as the distance B is large, the drugs 100 can be aligned as rearward as possible within the drug case 1 and accordingly, the drug pushing mechanism 3 can be also disposed rearward. Thus, the quantity of the projection of the lower case 2 from the lower end of the drug case 1 can be reduced, facilitating construction and arrangement of the apparatus.

On the upper and lower ends of the first door 10 is formed a cover plate 19 projecting toward the inside. In the cover plate 19 is formed a long aperture 20 extending obliquely from the vicinity of the projected hinge portions 13*a*, 13*b*. On the other hand, on the upper and lower ends of the second door 11 is formed a projection piece 21 so as to overlap with the cover plate 19 of the first door 10. On the projection piece 21 is formed a pin 22 which engages with the long aperture 20 of the cover plate 19 of the first door 10. The pin 22 and the long aperture 20 constitute an interlocking mechanism. When the first door 10 is opened or closed, as shown in FIGS. 4(*a*)-4(*c*), the interlocking mechanism allows the pin 22 to slide along the long aperture 20, thereby causing the second door 11 to be opened or closed in conjunction with the first door 10.

Figure 5:
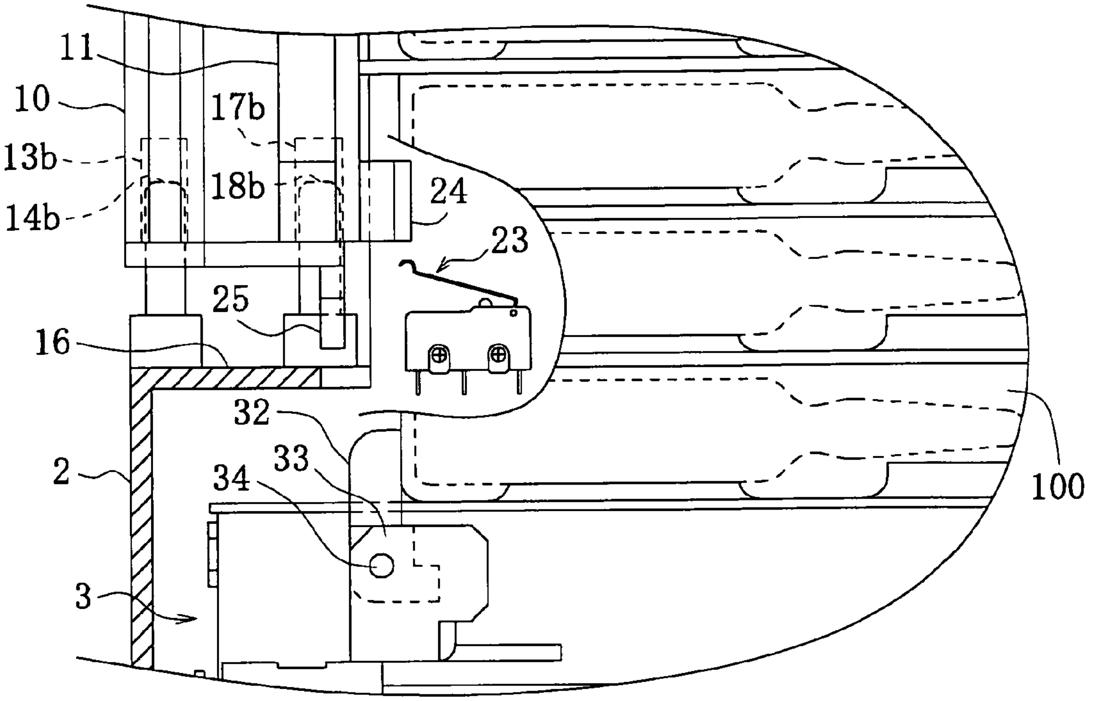
FIGS. 5(*a*) and 5(*b*) are enlarged sectional views of the bottom portion of the door in an unlocked state, and in a locked state, respectively.
Figure 5:
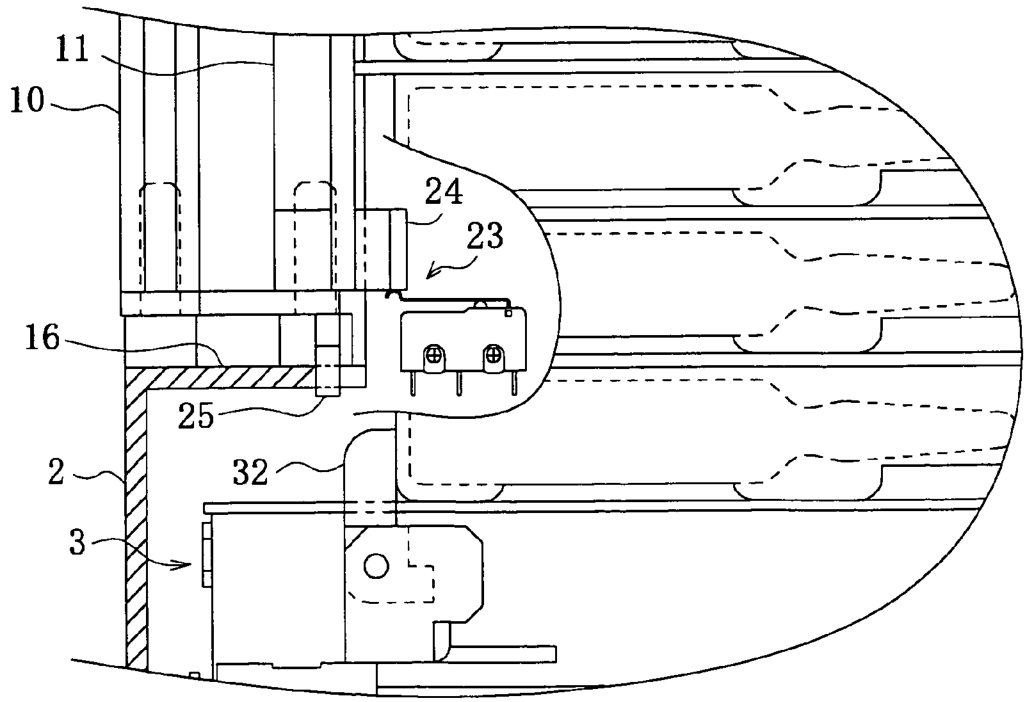

In the vicinity of the recessed hinge portion 17*b*, as shown in FIG. 5, is formed a protrusion 24 which pushes a closed position sensor 23 disposed in a proper position of the bottom of the drug case 1 when closing the door 7. The closed position sensor 23 comprises a microswitch. When the microswitch is ON, the drug pushing mechanism 3, which will be described hereinafter, is energized so as to become operable.

The first door and the second door 11 can slide within a predetermined range in a vertical direction as the recessed hinge portions 13*a*, 13*b*, 17*a*, 17*b* and the projected hinge portions 14*a*, 14*b*, 18*a*, 18*b* are fitted. In addition, a lock piece 25 extending downward is formed on the lower surface of the cover plate 19 of the lower side of the first door 10. The lock piece 25 constitutes a lock mechanism. In the lock mechanism, when the door 7 is opened by 90°, the lock piece 15 engages with the front edge of the shelf portion 16 to lock the door 7 in an opened state, and when the door 7 is closed, the lock piece 15 engages with the rear edge of the shelf portion 16 to lock the door 7 in a closed state.

On the front surface of the lower case 2, as shown in FIG. 1, there are disposed a light emitting lamp 26 for indicating shortage, a light emitting lamp 27 for indicating error and an error canceling button 28. The light emitting lamp 26 for indicating shortage is adapted to turn on when a shortage of the drug 100 is detected by a sensor (not shown). The light emitting lamp 27 for indicating error is adapted to turn on when it is not in a shortage state and when the discharge of the drug 100 is not detected by a sensor (not shown) due to clogging of the drug 100 or so even if the discharge operation of the drug is conducted. The error canceling button 28 is adapted to be pushed to restart the apparatus after removing the clog of the drug 100 to cancel the error.

The drug pushing mechanism 3 contained in the lower case 2, as shown in FIG. 2, comprises two rails 30 on which the lowermost drug 100 contained in the drug case 1 is rested, a screw 31 which is disposed below and extended along the rails 30 and is adapted to be driven forwardly and reversely by a motor and a pushing claw 32 which is adapted to be reciprocated along the screw 31. The pushing claw 32 is attached on a base 33 screwed on the screw 31 so that the pushing claw 32 is rotatable around a pin 34 between a standing position as shown in FIG. 2 and a laying position and is urged toward the standing position by a spring (not shown).

The drug dispensers described above having the same configuration are disposed horizontally and also disposed at a plurality of stages so that different drugs 100 can be dispensed.

Operation of the drug dispenser having above construction will be described.

Operation for dispensing the drug 100 will be described first. Forward rotation of the screw 31 allows the pushing claw 32 to move rearward. The lowermost drug 100 of the plurality of drugs stacked in the drug case 1 is pushed by the pushing claw 32, which is in a standing state at the start end position as shown by a solid line in FIG. 2, to move rearward on the rails 30. Then, the drug 100 is pushed out and contained in a tray (not shown) to be discharged outside via a predetermined path. When the lowermost drug 100 is pushed out, the second drug 100 falls on the rails 30 by its own weight. Consequently, the screw 31 is reversely rotated. This causes the pushing claw 32', which is positioned at the terminal end position as shown by a double-dashed chain line in FIG. 2, to move forward. The pushing claw 32' comes into contact with the rear end of the drug 100 to become a laying state. Then, the pushing claw 32' passes under the drug 100' and goes back to the start end position to move to a standing state. Then, the pushing claw 32' passes under the drug 100' and goes back to the start end position to be in a standing state. Repeating the above operation allows the drugs 100 to be sequentially dispensed.

In the case of shortage of the drugs 100, the door 7 of the drug case 1 is opened to fill the case 1 with the stacked drugs 100. Opening of the door 7 is conducted by holding the handle 12 to slide the door 7 upward so that the engagement of the lock piece 25 with the rear end of the shelf portion 16 can be released as shown in FIG. 5(*a*). When opening the first door 10, the second door 11 is opened in conjunction with the first door 10. When the door 7 is opened by 90°, the lock piece 25 falls away the shelf portion 16 and slides downward to engage with the front end of the shelf portion 16, allowing the door 7 to be locked in an opened state.

When the door 7 is opened, the drug case 1 can be filled with the drugs 100. All one has to do is just stack the drugs 100 sequentially. It is not necessary to align the drugs 100. When the door 7 is opened, as shown in FIG. 5(*a*), the protrusion 24 of the door 7 leaves the closed position sensor 23 to shut off the power to the medicine pushing mechanism 3, resulting in an inability to drive. Therefore, dispensing operation of the drug 100 is never conducted while filling the case 1 with the drugs 100, thereby ensuring safety. Moreover, as the door 7 is locked in an opened state as described above, the door 7 is never moved while filling the case 1 with the drugs 100, enabling the work to be conducted smoothly.

Figure 6:
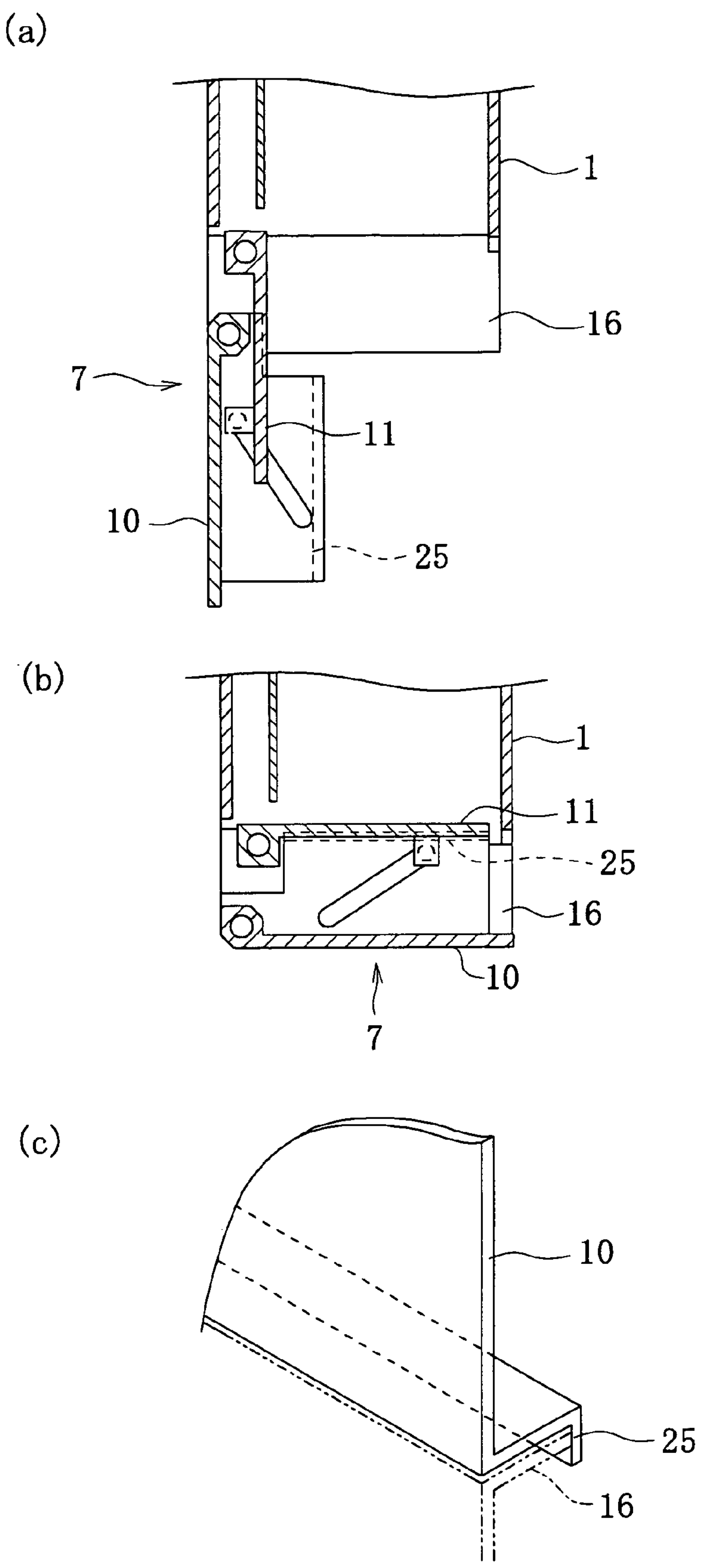
FIGS. 6(*a*) and 6(*b*) are sectional views of the door in an unlocked state, in a locked state, respectively.

After completion of filing the drug case 1 with the drugs 100, the door 7 is closed. Closing of the door 7 is conducted, in the same manner as in opening the door 7, by holding the handle 12 to slide the door 7 upward so that the engagement of the lock piece 25 with the front end of the shelf portion 16 can be released. When closing the first door 10, the second door 11 is closed in conjunction with the first door 10 as shown in FIGS. 4(*a*) to 4(*c*). When the door 7 is closed completely, as shown in FIG. 4(*c*), the inner surface of the second door 11 pushes the front ends of the plurality of drugs 100 so that the rear ends come into contact with the alignment plate 8, thereby causing the plurality of drugs 100 to be aligned. When pushing back the door 7, as shown in FIG. 6(*b*), the lock piece 25 falls away from the shelf portion 16 and slides downward to engage with the rear end of the shelf portion 16, allowing the door 7 to be locked in a closed state. When the door 7 is closed, as shown in FIG. 5(*b*), the protrusion 24 of the door 7 pushes the closed position sensor 23, thereby allowing the drug pushing mechanism to drive.

Although the interlocking mechanism of the first door 10 and the second door 11 in the above embodiment is comprised of the pin and the long aperture, the mechanism is not limited to this and may be comprised of gears, pulleys and so on.

Figure 8:
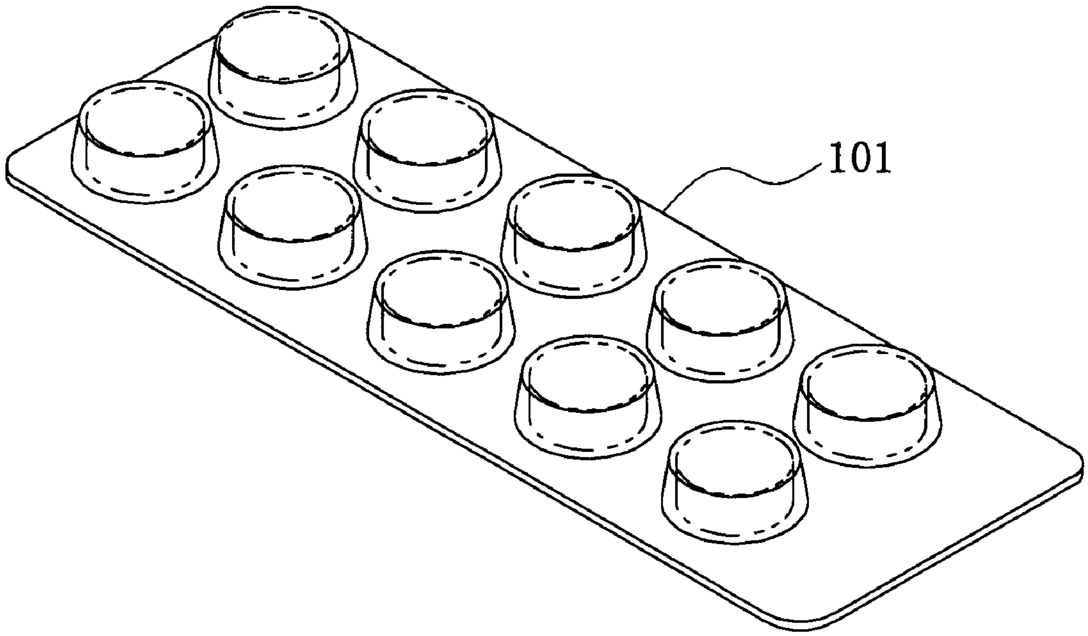
FIG. 8 is a perspective view of an example of a heat tablet.
Figure 9:
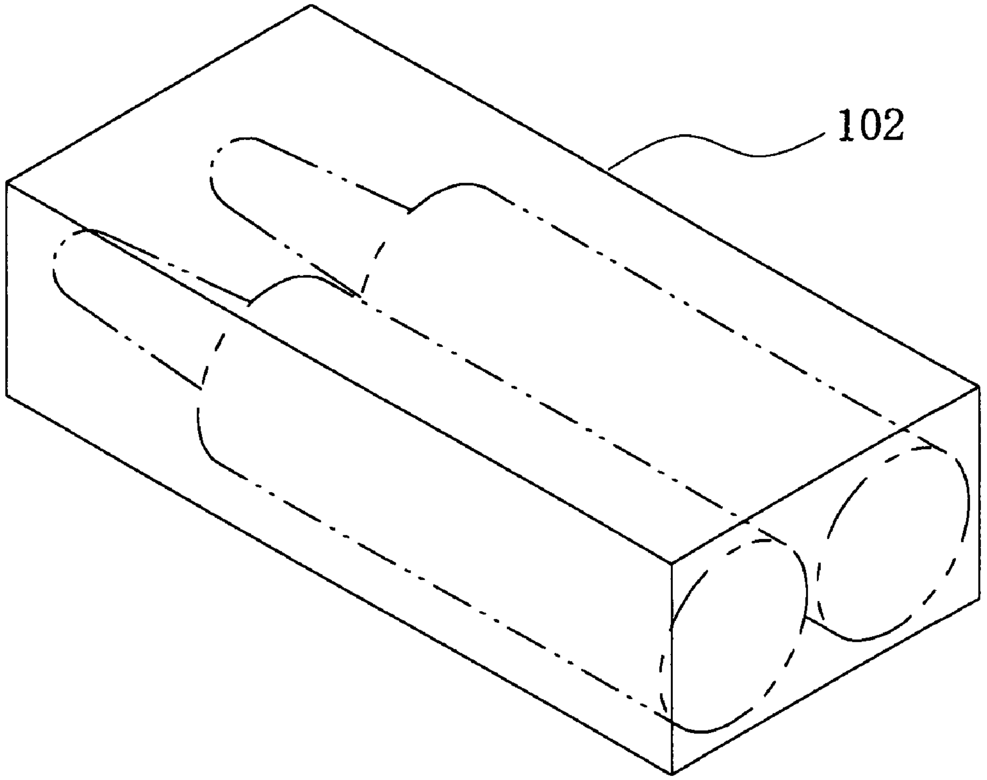
FIG. 9 is a perspective view of an example of a boxed special ampoule.

Although the above embodiment relates to the drug dispenser for dispensing the blister packs as shown in FIG. 7, the present invention can be applied to the drug dispensers for dispensing the drugs such as the heat tablets as shown in FIG. 8 and the boxed special ampoules as shown in FIG. 9 in the same manner.

What is claimed is:

1. A drug dispenser in which a lowermost drug of a plurality of drugs stacked in a vertical direction and contained in a drug case is pushed out in a horizontal direction to dispense it, wherein a door is provided on a front surface of the drug case, and the door comprises a first door and a second door disposed inside of the first door, and wherein the second door constitutes a drug aligning means, the drug aligning means pushing the front ends of the plurality of drugs contained in the drug case to align the rear ends thereof when the door is closed, and wherein the first and second doors are adapted to open and close by different hinges respectively, and the distance between the first and second doors when closed is larger than the distance between the first and second doors when open.

2. The drug dispenser as in claim 1, wherein the first and second doors have an interlocking mechanism to allow the second door to be opened and closed in conjunction with the first door when the first door is opened and closed.

3. The drug dispenser as claimed in claim 1, further comprising a sensor for detecting that the second door is in a closed position, wherein operation to dispense the drugs is made possible when the sensor detects that the second door is in a closed position.

4. The drug dispenser as claimed in claim 1, wherein the door is possible to slide in a vertical direction and is adapted to slide downward to be locked at the predetermined opened position and closed position.

5. The drug dispenser as claimed in claim 2, further comprising a sensor for detecting that the second door is in a closed position, wherein operation to dispense the drugs is made possible when the sensor detects that the second door is in a closed position.

6. The drug dispenser as claimed in claim 2, wherein the door is possible to slide in a vertical direction and is adapted to slide downward to be locked at the predetermined opened position and closed position.

7. The drug dispenser as claimed in claim 3, wherein the door is possible to slide in a vertical direction and is adapted to slide downward to be locked at the predetermined opened position and closed position.

8. A drug dispenser comprising:

a drug case for containing a plurality of drug packages that are stacked in a vertical direction;

a drug pushing mechanism for pushing out, in a horizontal direction, the lowermost drug package of the plurality of drug packages that are stacked in the vertical direction to dispense the lowermost drug package;

a first door hingedly mounted on the drug case;

a second door hingedly mounted on the drug case, wherein the second door is disposed inside of the first door, and the second door is operable to align the drug packages by closing the second door and pushing front ends of the drug packages contained in the drug case to align the rear ends thereof; and an interlocking mechanism connecting the first and second doors such that a distance between the first and second doors, when closed, is larger than a distance between the first and second doors when open.

9. The drug dispenser as claimed in claim 8, wherein the interlocking mechanism comprises at least one cover plate mounted on the first door, and a pin connected to the second door and extending through an elongated aperture formed in the cover plate, the elongated aperture extending at an angle relative to the first door.

10. The drug dispenser as claimed in claim 8, wherein at least one of the first and second doors can slide in a vertical direction, and slide downward to be locked in the open position and the closed position.

11. The drug dispenser as claimed in claim 8, further comprising a vertical alignment plate disposed on an opposite side of the drug case relative to the first and second doors, wherein the alignment plate is adjustably positioned in the drug case.

* * * * *